United States Patent

Hayward et al.

[11] Patent Number: 5,803,863
[45] Date of Patent: Sep. 8, 1998

[54] TRANSMISSION WARM-UP CONTROL STRATEGY

[75] Inventors: Randy R. Hayward, Mapleton; James E. Winzeler, East Peoria, both of Ill.

[73] Assignee: Caterpillar Inc., Peoria, Ill.

[21] Appl. No.: 813,958

[22] Filed: Mar. 3, 1997

[51] Int. Cl.$^6$ .................................................. F16H 59/72
[52] U.S. Cl. ............................................. 477/98; 475/117
[58] Field of Search ....................... 477/76, 98; 475/117, 475/158

[56] References Cited

U.S. PATENT DOCUMENTS

| | | | |
|---|---|---|---|
| 2,353,840 | 7/1944 | McKechnie | 477/98 |
| 2,630,893 | 3/1953 | Misch et al. | 477/76 |
| 2,726,557 | 12/1955 | Ackerman | 475/117 |
| 4,678,069 | 7/1987 | Yoshimura et al. | |
| 4,894,780 | 1/1990 | Simonyi et al. | 477/98 |
| 5,069,084 | 12/1991 | Matsuno et al. | |
| 5,520,593 | 5/1996 | Yesel et al. | 477/77 |
| 5,587,905 | 12/1996 | Yesel et al. | |
| 5,692,991 | 12/1997 | Swata et al. | 477/98 |

Primary Examiner—Rodney H. Bonck
Assistant Examiner—Sherry Lynn Estremsky
Attorney, Agent, or Firm—J. W. Burrows

[57] ABSTRACT

A transmission warm-up control strategy is provided for an automatic transmission used in a machine that is started or operated in cold conditions. When the operating value of the oil in the transmission is below a predetermined level, as sensed by a temperature sensor or a viscosity sensor, a controller turns on an indicator lamp, de-energizes all of the solenoid to the solenoid actuated valves, and holds for a predetermined period of time. The respective solenoids are incrementally energized and held for a second period of time while continuously monitoring the operating condition of the oil in the transmission. Once the operating condition of the oil is above the predetermined operating value, the indicator lamp is turned off and the system is returned to normal operating conditions. If the shift lever is moved from the park position during warm-up, all solenoids are de-energized and the indicator lamp is set to flash. The condition is held for the first predetermined period of time then the solenoids for the neutral clutches are energized and if the shift lever is not in the neutral position, the controller require that the shift lever be returned to the neutral or park position.

6 Claims, 6 Drawing Sheets

TRANSMISSION WARM-UP CONTROL STRATEGY

TECHNICAL FIELD

The present invention relates to generally to a transmission warm-up control strategy and more particularly to a transmission warm-up strategy for use in a machine prior to operating the transmission in its various gear ratios.

BACKGROUND OF THE INVENTION

Automatic transmissions are used in many machines and provide many advantages to the operator during normal work. In machines used today, such as motor graders, there are many different gear ratios that are each provided by engaging certain one of a plurality of fluid actuated clutches. These clutches are normally engaged by directing pressurized fluid through respective pressure modulation valves that are likewise controlled by solenoid actuated valves. The solenoid actuated valves are controlled in response to receipt of an electrical signal received from a controller. In order to provide a gradual increase in the pressurized fluid being directed to the respective clutches, various passages and orifices are used in the valves. Consequently, when the machine is being started and ran in a cold environment, the transmission oil is more viscous and does not freely flow through the passages and orifices. In most systems, the machine is started and allowed to run for a period of time in order for the oil in the transmission to warm-up. However, even though the oil in the transmission may warm to some degree, the oil in the respective pressure modulation valves does not move. Since the oil in the pressure modulation valves is still generally cold, actuation of the valve results in sluggish operation that may be detrimental to smooth operation of the transmission.

The present invention is directed to overcoming one or more of the problems set forth above.

DISCLOSURE OF THE INVENTION

In one aspect of the present invention, a method is provided for warming the oil in a transmission that is adapted for use on a machine being started or operated when the oil in the transmission is cold. The machine includes a source of pressurized fluid for pressurizing fluid operated clutches in the transmission and a shift lever that is in the park position when the machine is being warmed up and movable from a neutral position to select the desired direction of travel and the desired gear ratio. A signal representative of the shift lever position is directed to a controller for controlling engagement of certain ones of a plurality of fluid operated clutches to obtain the desired direction and speed ratio. The transmission also includes a solenoid operated pressure modulation valve for each of the fluid actuated clutches. The method includes the steps of sensing the position of the shift lever to determine if it is in the park position, detecting the operating condition of the oil used in the transmission, determining if the operating condition of the oil is above a predetermined operating value, turning on an indicator lamp if the operating condition of the oil is below the predetermined operating value, turning off all electrical signals to the solenoid operated pressure modulation valves, waiting for a first predetermined period of time after turning off all electrical signals, the first predetermined period of time being based on the condition of the oil in the transmission, actuating one of the solenoids and holding for a second predetermined period of time, disengaging the actuated solenoid, determining if the operating condition of the oil is above the predetermined value, holding for the first predetermined period of time, incrementing the sequence of actuating the solenoid operated pressure modulation valves until the operating condition of the oil in the transmission is above the predetermined value, and turning off the indicator lamp and returning the system to its normal operation.

These and other aspects, objects, features and advantages of the present invention will be more clearly understood and appreciated from a review of the following detailed description of the preferred embodiments and appended claims, and by the accompanying drawings.

BEST MODE FOR CARRYING OUT THE INVENTION

Figure 1:
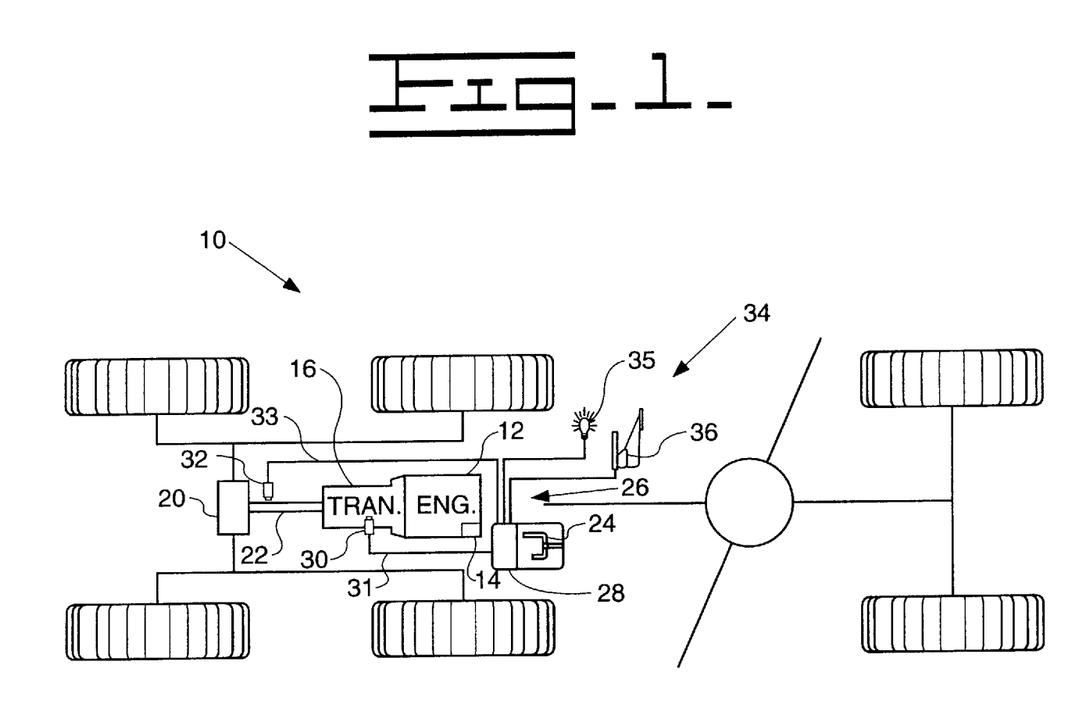
FIG. 1 is a diagrammatic representation of a machine incorporating an embodiment of the present invention.
Figure 2:
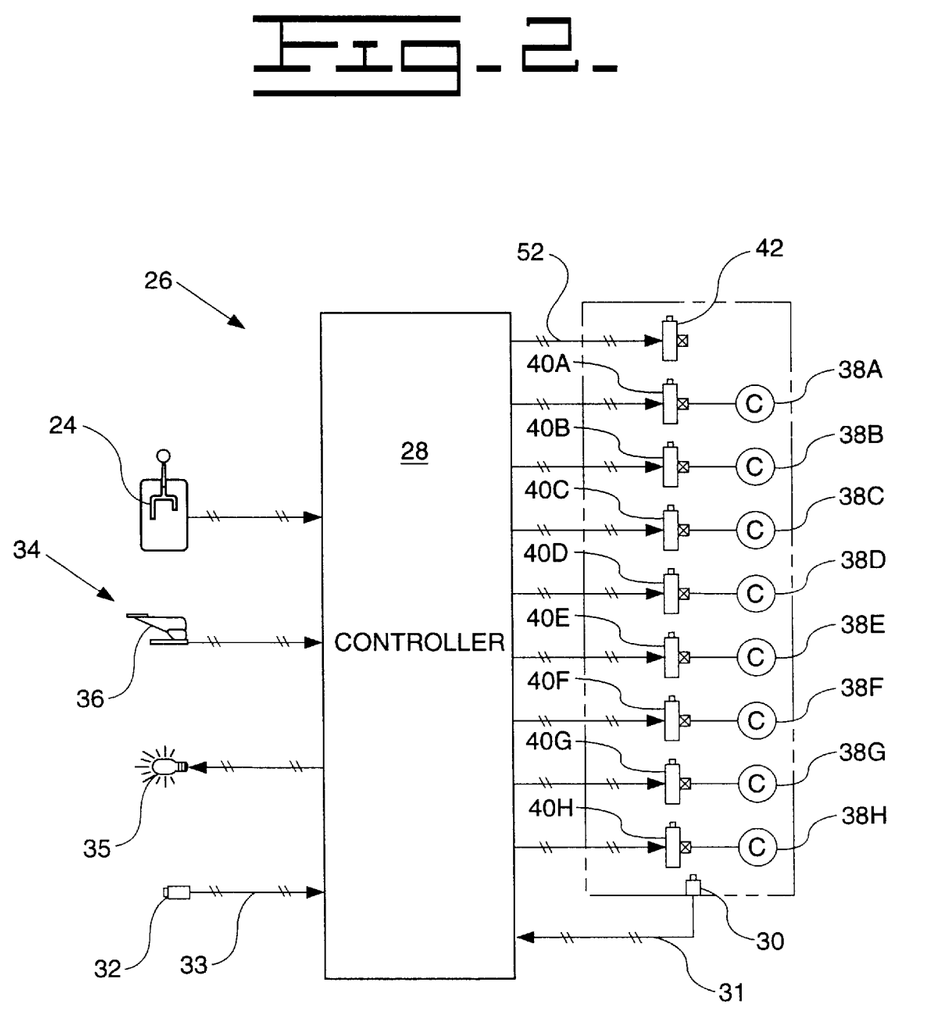
FIG. 2 is a partial diagrammatic and a partial schematic representation of a transmission control arrangement.

Referring to FIG. 1–2, a machine 10, such as a motor grader, has an engine 12 with an engine throttle control 14 for controlling the engine speed. A transmission 16 is operatively connected to the engine 12 and coupled to a differential gearing 20 by a shaft 22. The transmission output is measured in terms of the speed of rotation of its output shaft 22 in rpm. The transmission 16 of the subject disclosure is an automatic transmission, but it is recognized that other types of fluid drive transmissions could be used. A shift lever 24 is associated with the transmission 16 for shifting the transmission from the park position to the neutral position and then between its various forward and reverse gear ratios. In the subject machine, there are eight forward gear ratios and six reverse gear ratios. It is recognized that other numbers of gear ratios could be utilized without departing from the essence of the subject invention.

The transmission 16 has a control system 26 that includes a controller 28 that is operative to receive various system parameters and control the transmission in response to the system parameters. The control system 26 further includes an oil operating condition sensor 30 that may be in the form of a temperature sensor or a viscosity sensor. The oil operating condition sensor 30 delivers a signal to the controller 28 through an electrical line 31 that is representative of the operating condition of the oil in the transmission 16.

A speed sensor 32 is operatively associated with the transmission output shaft 22 and operative to deliver a signal through an electrical line 33 to the controller 28 that is representative of the speed of the output shaft 22. The machine 10 also includes an operator control mechanism 34 that is operatively associated with the controller 28 and includes a foot pedal 36 that is movable from a 0% percent travel position toward a 100% travel position in response to the operator's desired input. A lamp indicator 35 is operatively associated with the controller 28 and operative to indicate that the transmission is not operating at its normal operating level.

As more clearly illustrated in FIG. 2, the transmission 16 includes a plurality of fluid actuated clutches 38A–H and the transmission control system 26 includes a plurality of pressure modulation valves 40A–H operatively connected to the plurality of fluid operated clutches 38A–H. In the subject embodiment, the pressure modulation valves 40A–H are each solenoid actuated valves. The transmission control system 26 also includes a solenoid actuated manual modulation valve 42 that is operatively associated with the controller 28 and controlled in response to movement of the foot pedal 36.

The shift lever 24 is a multi-contact switch that sends position information to the controller 28 to indicate the desired direction of travel and the desired gear ratio for the transmission 16. When the transmission speed, as indicated by the speed sensor 32, and the engine speed permit a shift to the desired gear, the controller 28 sends the appropriate signals to the transmission control system 26 to provide the selected direction and gear ratio. As is known in the art, the appropriate solenoid actuated pressure modulation valves 40A–H operate the corresponding fluid actuated clutches 38A–H and thereby determine the actual travel and gear ratio of the transmission 16.

Figure 3:
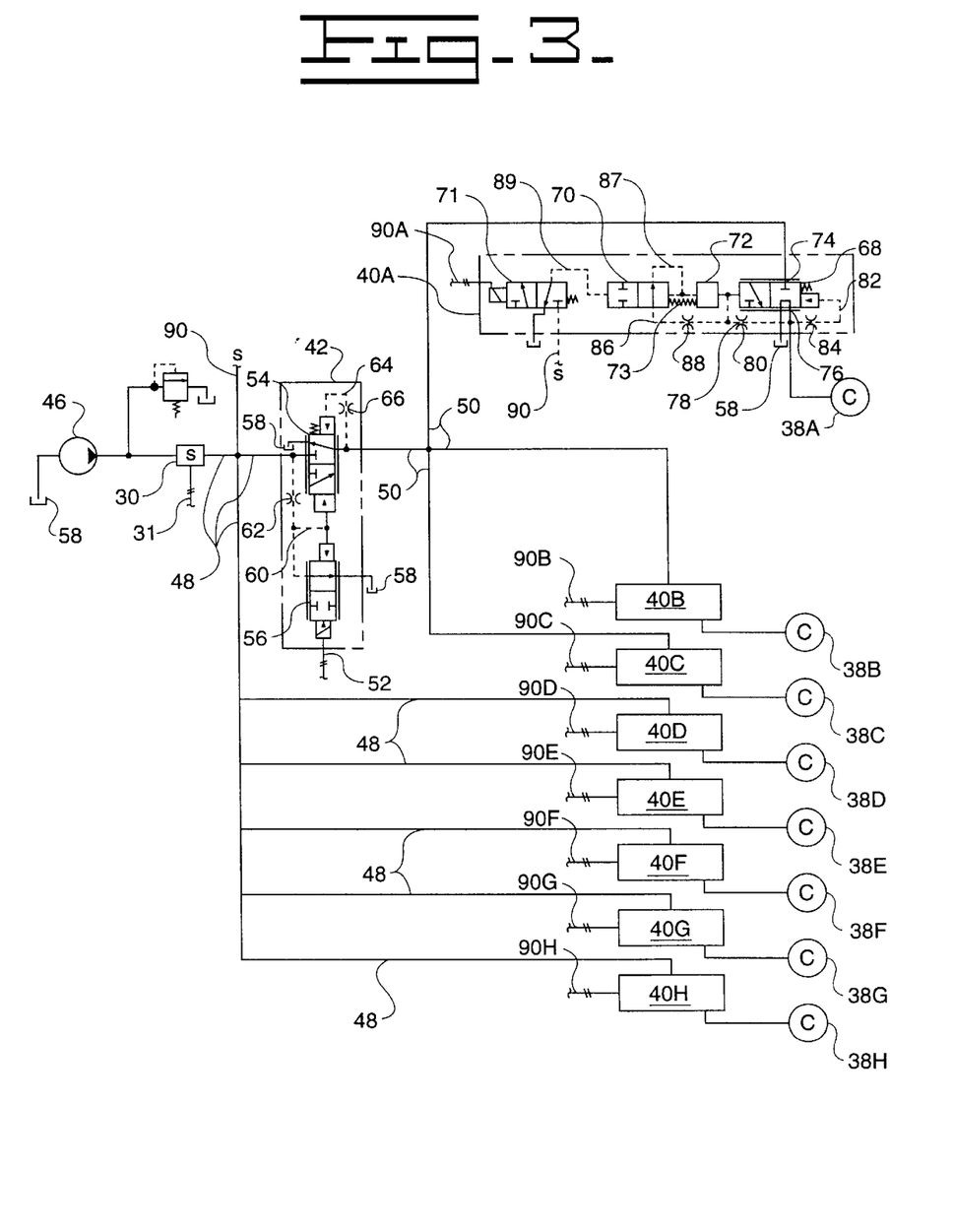
FIG. 3 is a schematic representation of a portion of the subject invention.

Referring to FIG. 3, the schematic illustrates that the machine 10 includes a source of pressurized fluid 46 that is operatively connected to the plurality of solenoid actuated pressure modulation valves 40A–H and the solenoid actuated manual modulation valve 42. More specifically, the source of pressurized fluid 46 is connected in parallel to the manual modulation valve 42 and the pressure modulation valves 40D–H by a supply conduit 48. The pressure modulation valves 40A–C are connected to the manual modulation valve 42 through a second supply conduit 50. The oil operating condition sensor 30 is disposed in the supply conduit 48 upstream of the respective manual modulation valve 42 and the plurality of pressure modulation valves 40A–H and delivers an electrical signal to the controller 28 through the electrical line 31. Even though the oil operating condition sensor 30 is illustrated as being in the supply conduit 48, it is recognized that it could be located in other areas of the hydraulic system, such as, in one of the drain lines associated with one of the modulation valves or in one of the pilot lines of the manual modulation valve 42.

The manual modulation valve 42 is a proportional valve that control the magnitude of pressure that is provided downstream thereof to the second supply conduit 50 in response to the magnitude of the electrical signal received from the controller 28 through an electrical line 52. The manual modulation valve 42 general includes a two-position, three-way pilot operated valve 54 and a two-position, two-way solenoid actuated valve 56. The pilot operated valve 54 is spring biased to a first position at which the second conduit 50 is in open communication with a reservoir 58 and the first supply conduit 48 is blocked. The pilot operated valve 54 is movable towards the second position at which the first conduit 48 is in fluid communication with the second supply conduit 50 and the reservoir 58 is blocked. The pilot operated valve 54 is movable towards the second position in response to pressurized fluid in a pilot conduit 60 that is in communication with the first supply conduit 48 through an orifice 62. The pilot operated valve 54 is also urged towards its first position by the force of the pressurized fluid in a conduit 64 that is in communication with the second supply conduit 50 through an orifice 66.

The solenoid actuated valve 56 is biased to its first position by the force of the pressurized fluid in the pilot conduit 60 at which the pilot conduit 60 is in open communication with the reservoir 58 and movable towards its second blocking position in response to the electrical signal received from the controller 28 through the electrical line 52.

Figure 4:
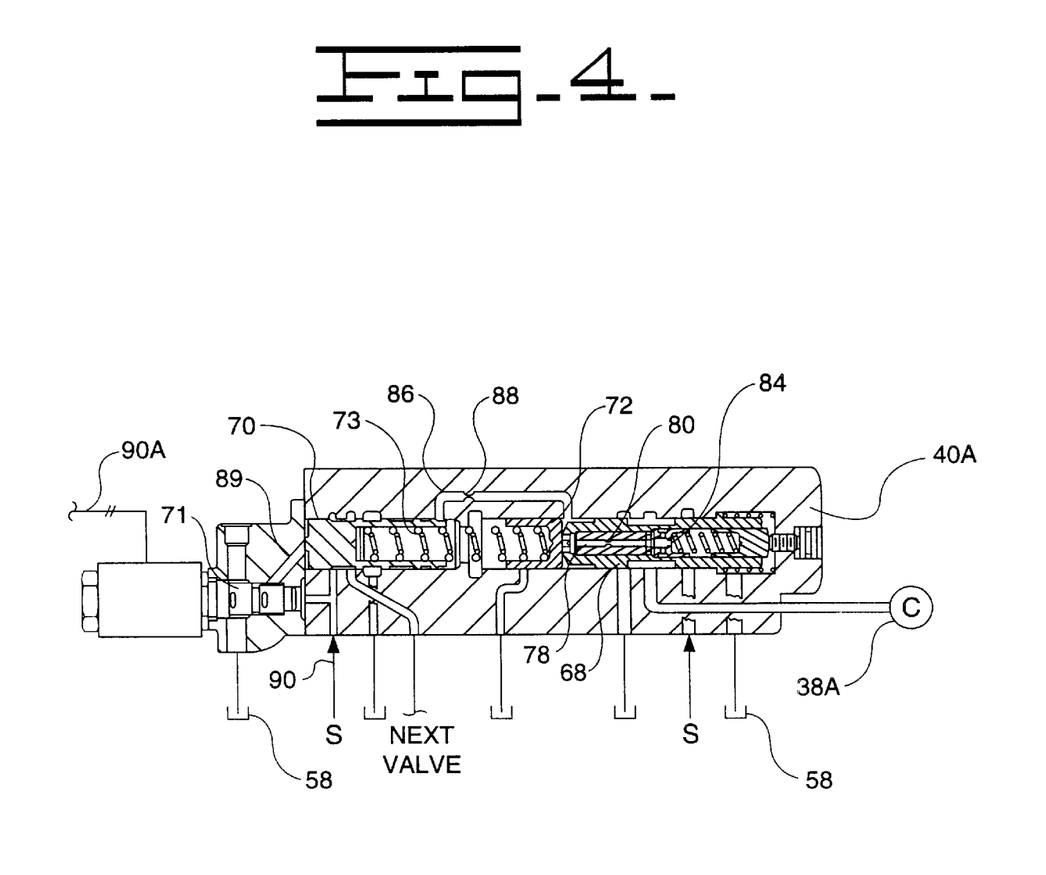
FIG. 4 is a diagrammatic representation of a portion of FIG. 3.

Each of the pressure modulation valves 40A–H are of the same construction and only one of them will be described in detail. The schematic representation illustrated in FIG. 3 is only a general representation of the pressure modulation valves and the hydraulic system. A diagrammatic representation is illustrated in FIG. 4. The only significant difference between the schematic representation and the diagrammatic representation is that the respective solenoid valves receive pressurized fluid from the source of pressurized fluid 46 and each solenoid valve has a flow inhibitor that prohibits flow to certain other ones of the solenoid valves when the solenoid is energized. Each of the pressure modulation valves 40a–H includes a two-position, three-way pilot operated valve 68, a two-position, two-way solenoid operated valve 70, and a load piston 72. An inlet 74 to the pilot operated valve 68 is connected to the appropriate supply conduit 48/50 and an outlet 76 thereof is connected to the respective fluid actuated clutches 38A–H. The pilot operated valve 68 is spring biased to a first position at which the inlet 74 is blocked and the outlet 76 is in open communication with the reservoir 58. The pilot operated valve 68 is movable towards the second position at which the inlet 74 is in open communication with the outlet 76 and the reservoir 58 is blocked. The pressurized fluid in a pilot conduit 78 that is connected to the pressurized fluid in the outlet 76 through an orifice 80 acts to bias the pilot operated valve 68 towards its second position. The pilot operated valve 68 is urged towards its first position in response to the pressurized fluid in a pilot conduit 82 that is connected to the pressurized fluid in the outlet 76 through an orifice 84.

The spring 73 biases the two-way pilot operated valve 70 towards a first position at which a conduit 86 is in open communication to an area within the spring chamber 73 through a conduit 87. The conduit 86 is connected to the conduit 78 through an orifice 88. The pressurized fluid in the conduit 78 also acts on the load piston 72 and is effective to increase the load on the spring 73. The two-way pilot operated valve 70 is movable towards its second position in response to receipt of pressurized fluid through a conduit 89 from the solenoid operated valve 71. The solenoid operated valve 71 is spring biased to a first position at which pressurized fluid in the conduit 89 is in communication with the reservoir 58. The solenoid operated valve 71 is movable towards its second position in response to electrical signal from the controller 28 through respective electrical lines 90A–H. With the solenoid operated valve 71 in its second position, the source of pressurized fluid 46 is in communication through conduits 90,89 with the end of the two-way pilot operated valve 71 that is opposite the spring 73.

Referring to FIG. 4, a diagrammatic illustration of the pressure modulation valve is shown. Corresponding schematic elements of FIG. 3 and diagrammatic elements of FIG. 4 have like element numbers. The FIG. 4 representation is provided primarily to illustrate the intricate passages and orifices that are included in the actual structure of the pressure modulation valves 40A–H.

Figure 5:
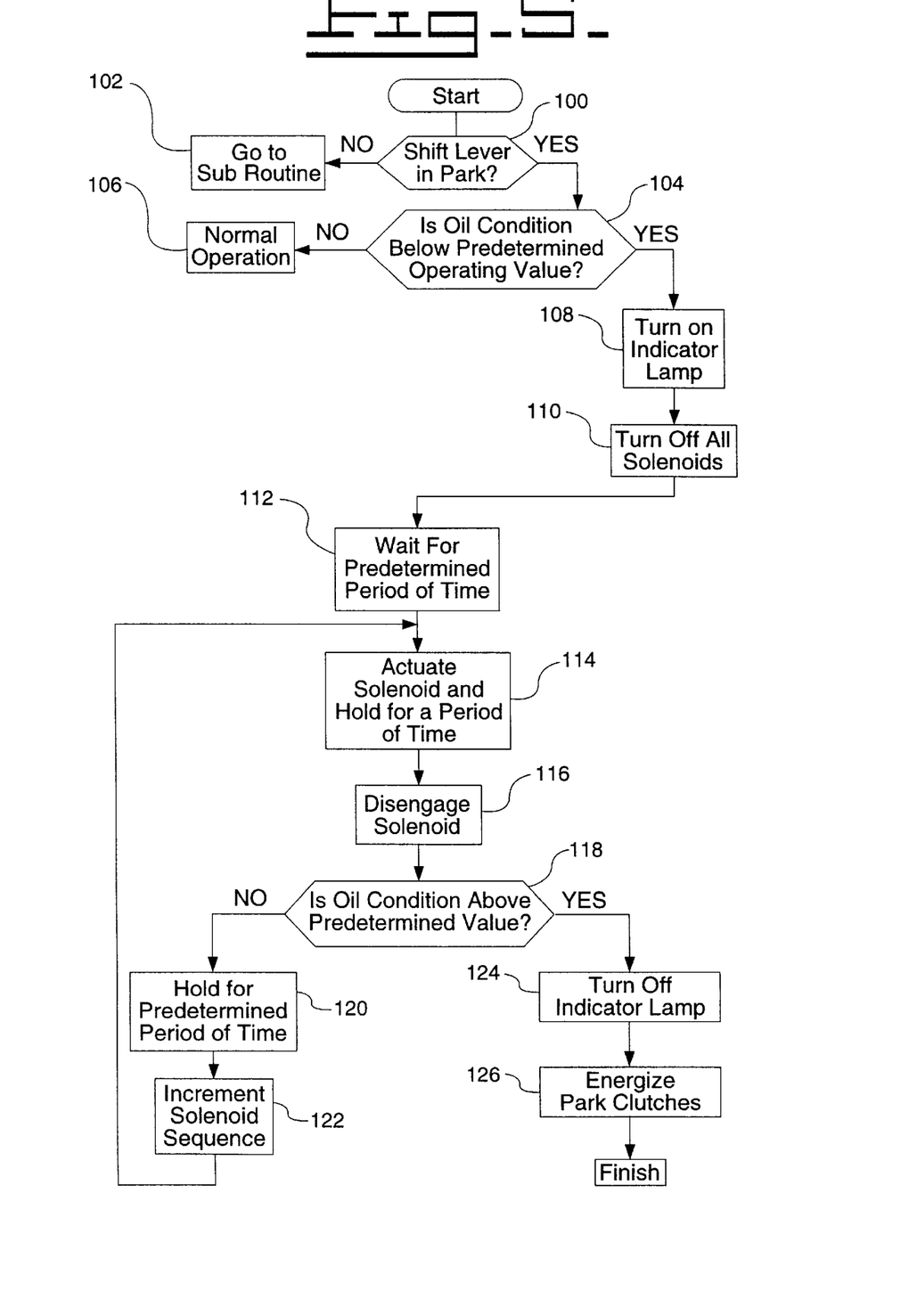
FIG. 5 is a flow chart depicting a method for controlling the shift strategy of an automatic transmission when the oil in the transmission is cold.

Referring to FIG. 5, a flow chart depicts a method for warming the oil in a transmission 16 prior to normal operation. Following startup of the machine, a decision block 100 determines whether the shift lever 24 is in the park position. If the shift lever is not in the park position, a block 102 directs the program to a sub-routine which will be subsequently described. If the shift lever 24 is in the park position, a decision block 104 determines whether the oil operating condition is below a predetermined operating value. The value of the oil's operating condition varies with a change in the temperature of the oil. For example, as the temperature of the oil decreases, the operating condition of the oil decreases. If the oil operating condition is above the predetermined operating value, a block 106 selects a normal operating condition. If the oil operating condition is below the predetermined operating value, a block 108 turns on the indicator lamp 35. A block 110 turns off all of the pressure modulation valves 40A–H and the manual modulation valve 42 by prohibiting electrical signals therefrom. A block 112 causes a wait for a predetermined period of time to permit any previously actuated clutch and associated pressure modulation valve to drain. A block 114 actuates one of the solenoid actuated pressure modulation valves and holds for a second predetermined period of time. If any one of the pressure modulation valves 40A–C is being operated, the manual modulation valve 42 is also actuated since it is disposed between the source of pressurized fluid 46 and the respective pressure modulation valves 40A–C. A block 116 disengages the modulation valve(s) that was actuated in block 114. A decision block 118 determines whether the oil condition is above or below the predetermined value. If the oil condition is not above the predetermined value, a block 120 holds for the first predetermined period of time. A block 122 increments to another one of the pressure modulation valves 40A–H in a sequential manner and goes back to the block 114 and repeats until the oil condition is above the predetermined value.

Once the oil condition is above the predetermined value, a block 124 turns off the indicator lamp 35 and a block 126 proceeds to actuate any park clutches that are required. Once the park clutches are actuated, the transmission 16 is ready for normal operation.

Figure 6:
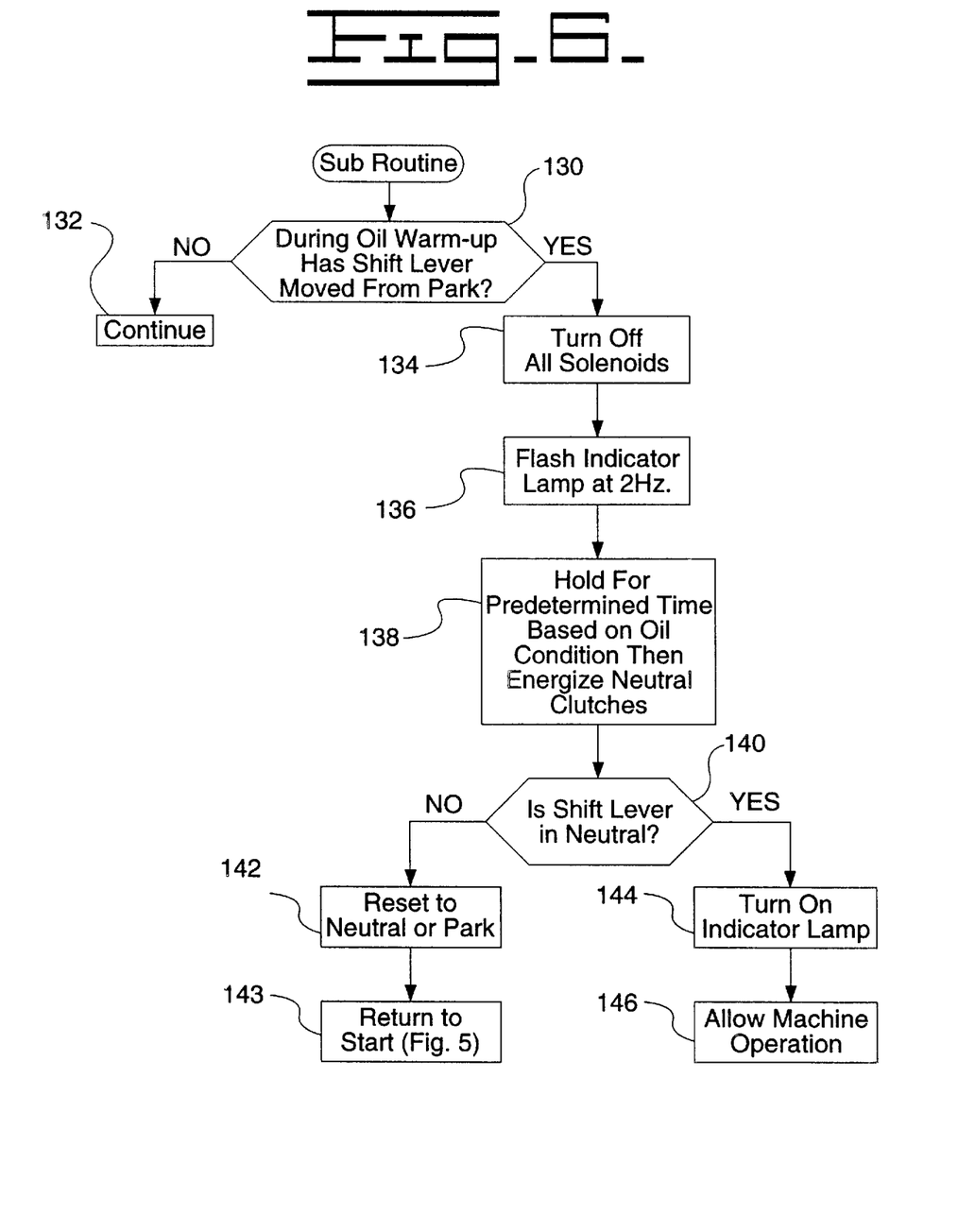
FIG. 6 is a sub routine of the flow chart of FIG. 5.

Referring to FIG. 6, the sub-routine noted above is set forth. A decision block 130 determines whether the shift lever 24 has been moved from the park position during the warm-up sequence. If the shift lever 24 has not been moved from the park position, a block 132 continues the warm-up sequence as set forth in FIG. 5. If the shift lever 24 has been moved form the park position, a block 134 turns off all of the electrical energy going to all of the modulation valves 40A–H,42. A block 136 flashes the indicator lamp 35 at 2 Hz. A block 138 holds for the first predetermined amount of time that is based on the oil condition then energizes the neutral clutches.

A decision block 140 determines whether the shift lever 24 is in the neutral position. If the shift lever is not in the neutral position, a block 142 requires that the shift lever be reset to the neutral or park position and a block 143 returns the program to the start block of FIG. 5. If the shift lever 24 is in the neutral position, a block 144 turns on the indicator lamp 35 and a block 146 allows the machine to operate under the cold oil condition with the indicator lamp turned on.

As noted above, if the operating condition of the oil is being sensed by the viscosity sensor, the predetermined amounts of time set forth in the look-up table would be based on the viscosity of the oil at different operating conditions below the normal operating condition.

Industrial Applicability

During the initial starting of the machine 10 incorporating the subject invention, the oil in the transmission 16 is warmed-up in a controlled manner. Since the pressure modulation valves 40A–H and the manual modulation valve 42 each have numerous small passages and orifices, it is very difficult to get the oil to flow therethrough to either engage the respective fluid actuated clutches 38A–H or to disengage them. Consequently, if the transmission 16 is operated with cold oil, the fluid actuated clutches 38A–H could be subjected to partial or full engagement of opposing clutches. This would be detrimental to the components of the transmission and/or cause the machine to operated in a harsh or jerky manner.

By using the above described method of warming the oil in the transmission 16, the transmission of the machine is placed in a normal, operative condition faster.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications and that such changes do not depart from the true spirit and scope of the invention.

We claim:

1. A method of warming the oil in a transmission adapted for use on a machine being started or operated when the oil in the transmission is cold, the machine includes a source of pressurized fluid for pressurizing fluid operated clutches in the transmission and a shift lever that is in the park position when the machine is being warmed up and movable from a neutral position to select the desired direction of travel and the desired gear ratio and direct a signal representative thereof to a controller for controlling engagement of certain ones of a plurality of fluid operated clutches to obtain the desired direction and speed ratio, the transmission also includes a solenoid operated pressure modulation valve for each of the fluid actuated clutches, the method comprising the steps of:

sensing the position of the shift lever to determine if it is in the park position;

detecting the operating condition of the oil used in the transmission;

determining if the operating condition of the oil is above a predetermined operating value;

turning on an indicator lamp if the operating condition of the oil is below the predetermined operating value;

turning off all electrical signals to the solenoid operated pressure modulation valves;

waiting for a first predetermined period of time after turning off all electrical signals, the first predetermined period of time being based on the condition of the oil in the transmission;

actuating one of the solenoids and holding for a second predetermined period of time;

disengaging the actuated solenoid;

determining if the operating condition of the oil is above the predetermined value;

holding for the first predetermined period of time;

incrementing the sequence of actuating the solenoid operated pressure modulation valves until the operating condition of the oil in the transmission is above the predetermined value; and turning off the indicator lamp and returning the system to normal operation.

2. The method of claim 1 wherein when the shift lever is in the neutral or park position, certain ones of the solenoid operated pressure modulation valves are energized and in the step of returning the system to normal operation the certain ones of the solenoid operated pressure modulation valves are energized.

3. The method of claim 2 wherein during warm-up if the shift lever is moved from the park position, the method follows the following steps;

de-energizing all solenoids and flashing the indicator lamp;

holding for the first predetermined period of time then energizing all solenoids for the neutral clutches;

determining if the shift lever is in the neutral position and requiring reset to neutral or park if necessary;

turning on indicator lamp if operating condition of oil is still below predetermined operating value.

4. The method of claim 3 wherein the transmission includes a solenoid operated manual modulation valve operative to control the pressure level of the source of pressurized fluid being directed to at least some of the solenoid actuated modulation valves and in the step of incrementing the sequence of actuating the solenoid operated pressure modulation valves the solenoid operated manual modulation valve is included in the sequence whenever the at least some of the solenoid actuated valves are used in the sequence.

5. The method of claim 4 wherein in the step of detecting the operating condition of the oil in the transmission a temperature sensor is located in the transmission and operable to detect the operating temperature of the oil and deliver an electrical signal representative of the oil temperature to the controller.

6. The method of claim 4 wherein in the step of detecting the operating condition of the oil in the transmission a viscosity sensor is located in the transmission and operable to detect the operating viscosity of the oil and deliver an electrical signal representative of the oil viscosity to the controller.

* * * * *